United States Patent
Scheim et al.

(10) Patent No.: US 10,584,244 B2
(45) Date of Patent: Mar. 10, 2020

(54) AQUEOUS DISPERSIONS OF ORGANOSILICON COMPOUNDS

(71) Applicant: Wacker Chemie AG, Munich (DE)

(72) Inventors: Uwe Scheim, Coswig (DE); Marco Kauschke, Glaubitz (DE); Stephan Marrack, Weinboehla (DE); Marko Prasse, Glaubitz (DE); Holger Rautschek, Nuenchritz (DE)

(73) Assignee: WACKER CHEMIE AG, Munich (DE)

( * ) Notice: Subject to any disclaimer, the term of this patent is extended or adjusted under 35 U.S.C. 154(b) by 9 days.

(21) Appl. No.: 15/549,613

(22) PCT Filed: Feb. 4, 2016

(86) PCT No.: PCT/EP2016/052400
§ 371 (c)(1),
(2) Date: Aug. 8, 2017

(87) PCT Pub. No.: WO2016/128293
PCT Pub. Date: Aug. 18, 2016

(65) Prior Publication Data
US 2018/0030274 A1    Feb. 1, 2018

(30) Foreign Application Priority Data

Feb. 9, 2015 (DE) .......................... 10 2015 202 278

(51) Int. Cl.

| | |
|---|---|
| *C08G 65/336* | (2006.01) |
| *C08G 77/46* | (2006.01) |
| *C08K 3/26* | (2006.01) |
| *C08L 71/02* | (2006.01) |
| *C08L 83/10* | (2006.01) |
| *C08L 83/12* | (2006.01) |
| *C09D 7/61* | (2018.01) |
| *C09D 183/10* | (2006.01) |
| *C09D 183/12* | (2006.01) |

(52) U.S. Cl.
CPC ............ *C08L 83/12* (2013.01); *C08G 65/336* (2013.01); *C08L 71/02* (2013.01); *C08L 83/10* (2013.01); *C09D 7/61* (2018.01); *C09D 183/10* (2013.01); *C09D 183/12* (2013.01); *C08G 77/46* (2013.01); *C08K 3/26* (2013.01); *C08K 2003/265* (2013.01)

(58) Field of Classification Search
CPC ........ C08G 77/46; C08G 65/336; C08K 3/26; C08K 2003/265; C08L 71/02; C08L 83/10; C08L 83/12; C09D 183/10; C09D 7/61; C09D 183/12
See application file for complete search history.

(56) References Cited

U.S. PATENT DOCUMENTS

| | | |
|---|---|---|
| 7,332,541 B2 | 2/2008 | Schindler et al. |
| 7,977,445 B2 | 7/2011 | Hattemer et al. |
| 2014/0155545 A1 | 6/2014 | Stanjek et al. |
| 2015/0203729 A1 | 7/2015 | Stanjek et al. |
| 2015/0307757 A1 | 10/2015 | Stanjek et al. |

FOREIGN PATENT DOCUMENTS

| | | |
|---|---|---|
| DE | 102011006130 A1 | 9/2012 |
| DE | 102011081264 A1 | 2/2013 |
| DE | 102012200790 A1 | 7/2013 |
| DE | 102012223139 A1 | 6/2014 |
| DE | 102013213835 A1 | 1/2015 |
| EP | 0771855 A2 | 5/1997 |
| JP | 596219 A | 1/1984 |
| WO | 14026906 A1 | 2/2014 |

OTHER PUBLICATIONS

Guo, Xiaowen et al., "Calculation of Hydrophile-lipophile Balance for Polyethoxylated Surfactants by Group Contribution Method," Journal of Colloid and Interface Science, 2006, pp. 441-450, 298, Elsevier (10 Pages).
Sangster, J., "Chapter 3: Experimental Methods of Measurement," Octanol-Water Partition Coefficients: =Fundamentals and Physical Chemistry, 1997, Wiley Series in Solution Chemistry, vol. 2, John Wiley & Sons, Chichester (12 Pages).
English abstract for JP 596219 A.
English abstract for DE 102013213835 A1.
English abstract for DE 1020111006130 A1.
English abstract for DE 102012200790 A1.

*Primary Examiner* — Patrick D Niland
(74) *Attorney, Agent, or Firm* — Brooks Kushman P.C.

(57) ABSTRACT

Aqueous dispersions which are storage stable and cure to tack-free elastomers upon removal of water contain water, alkoxysilyl-terminated polyethers and alkoxy-functional siloxanes, optionally catalysts, fillers, and other additives customary in dispersions of organosilicon compounds.

18 Claims, No Drawings

AQUEOUS DISPERSIONS OF ORGANOSILICON COMPOUNDS

CROSS REFERENCE TO RELATED APPLICATIONS

This application is the U.S. National Phase of PCT Appln. No. PCT/EP2016/052400 filed Feb. 4, 2016, which claims priority to German Application No. 10 2015 202 278.1 filed Feb. 9, 2015, the disclosures of which are incorporated in their entirety by reference herein.

BACKGROUND OF THE INVENTION

1. Field of the Invention

The invention relates to dispersions of organosilicon compounds which, following removal of water can be converted into elastomers, to methods for producing them, and to the use thereof as sealants and filling compounds, adhesives, jointing mortars, coatings on wood, concrete, and other building materials, and binders for particles, such as woodchips, for example.

2. Description of the Related Art

Dispersions of silyl-terminated polyethers are already known. For example, JP-A 59-6219 describes emulsions of silyl-terminated polyethers. EP-A 771 855 discloses pre-crosslinked emulsified silyl-terminated polymers, especially polyethers. As a result of the pre-crosslinking a suspension is formed.

U.S. Pat. No. 7,332,541 describes systems comprising silyl-terminated polyethers with regulatable reactivity. These systems may be provided either in anhydrous form or as emulsions.

U.S. Pat. No. 7,977,445 discloses emulsions of silyl-terminated polyethers wherein the silyl function is bonded via a $CH_2$ group to a functional group having a free electron pair, such as to an aminic function, for example.

A common factor OF all of these mixtures is either that they do not exhibit tack-free curing or else, with appropriate catalysis, do exhibit tack-free curing, but then the emulsions or dispersions have poor storage stability.

SUMMARY OF THE INVENTION

Surprisingly it has now been found that emulsions comprising substantially silyl-terminated polymers and alkoxy-functional silicon compounds produce outstandingly storage-stable emulsions which cure rapidly to tack-free products under the action of catalysts and following removal of the water.

DETAILED DESCRIPTION OF THE PREFERRED EMBODIMENTS

A subject of the invention are dispersions comprising
(A) silyl-terminated polymers of the formula

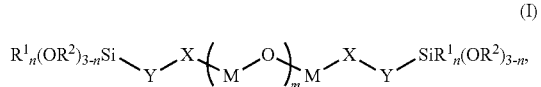

(I)

where
$R^1$ may be identical or different and is a monovalent, optionally substituted, SiC-bonded hydrocarbyl radical,
$R^2$ may be identical or different and is hydrogen atom or a monovalent, optionally substituted hydrocarbyl radical,
X may be identical or different and is —O—, —$NR^3$— where $R^3$ is a hydrogen atom, or an aliphatically saturated or aromatic hydrocarbyl radical having 1 to 12 carbon atoms,
Y may be identical or different and is a radical —$(CH_2)_3$—, —$(CH_2)_3NHC(=O)$—, —$CH_2$— or —$CH_2NHC(=O)$—,
M may be identical or different and is a radical —$CH_2CH_2$—, —$CH_2CH(CH_3)$—, —$(CH_2)_4$— or —$(CH_2)_6$—,
n is 0 or 1, and
m is an integer from 50 to 500, preferably from 80 to 400, and more preferably 200 to 400,
(B) organosilicon compounds comprising units of the formula

(II), where
$R^4$ may be identical or different and is a monovalent, SiC-bonded hydrocarbyl radical optionally substituted by halogen radicals, oxygen or nitrogen,
$R^5$ may be identical or different and is hydrogen atom or a monovalent, optionally substituted hydrocarbyl radical,
a is 0, 1, 2 or 3,
b is 0, 1, 2 or 3,
with the proviso that the sum a+b≤3, there are at least two groups —$OR^5$ per molecule, and a is 0 or 1 in at least 40% of all units of the formula (II),
(C) emulsifiers,
(D) water,
optionally (E) catalysts,
optionally (F) fillers, and
optionally (G) additives.

Examples of radicals $R^1$ are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical, octyl radicals such as the n-octyl radical, isooctyl radicals, and the 2,2,4-trimethylpentyl radical; nonyl radicals such as the n-nonyl radical; long-chain n-alkyl radicals such as the n-decyl, n-dodecyl, n-tetradecyl, n-hexadecyl, n-octadecyl, n-eicosyl, n-docosyl, n-tetracosyl, n-hexacosyl, n-octacosyl, n-triacontyl, n-dotriacontyl, and n-tetracontyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m-, and p-tolyl radicals, xylyl radicals, and ethylphenyl radicals; and aralkyl radicals such as the benzyl radical and the α- and the β-phenylethyl radicals.

If radical $R^1$ comprises substituted hydrocarbyl radicals, preferred substituents are halogen radicals, such as fluoro or chloro, oxygen, such as epoxy radicals, or nitrogen, such as amine radicals, for example.

Examples of substituted radicals $R^1$ are haloalkyl radicals such as the 3,3,3-trifluoro-n-propyl radicals, the 2,2,2,2',2', 2'-hexafluoroisopropyl radical, and the heptafluoroisopropyl radical, and haloaryl radicals such as the o-, m-, and p-chlorophenyl radicals, the 3-chloropropyl radical, oxygen-substituted radicals such as the 3-glycidyloxypropyl radical, and nitrogen-substituted radicals such as the 3-aminopropyl radical and the 3-(2-aminoethyl)aminopropyl radical.

Radical $R^1$ preferably comprises monovalent hydrocarbyl radicals having 1 to 12 carbon atoms, optionally substituted by halogen atoms, and more preferably comprises alkyl or aryl radicals having 1 to 12 carbon atoms, and more preferably comprises the methyl radical.

Examples of radical $R^2$ are hydrogen or the examples specified for radical $R^1$.

Radical $R^2$ preferably comprises hydrogen or alkyl radicals having 1 to 12 carbon atoms, optionally substituted by halogen atoms, and more preferably comprises alkyl radicals having 1 to 4 carbon atoms, and more preferably comprises the methyl or ethyl radical.

Examples of radical $R^3$ are the examples specified for radical $R^1$ of hydrocarbyl radicals having 1 to 12 carbon atoms, with radical $R^3$ preferably comprising alkyl or aryl radicals having 1 to 12 carbon atoms.

Radical X is preferably —O—.

In formula (I) the radicals Y are preferably bonded via the $CH_2$ group to silicon.

Radical Y preferably comprises —$(CH_2)_3$NHC(=O)— or —$CH_2$NHC(=O)—, more preferably —$CH_2$NHC(=O)—.

In component (A) preferably at least 90%, more preferably at least 99%, of all radicals M have the definition of —$CH_2CH(CH_3)$—.

In the case of M as —$CH_2CH(CH_3)$—, M may be bonded in any directions in the molecular of the formula (I), i.e., —$CH_2CH(CH_3)$— or —$(CH_3)CHCH_2$—.

Examples of component (A) are

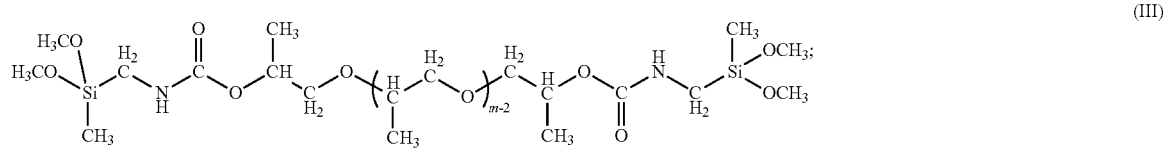

(III)

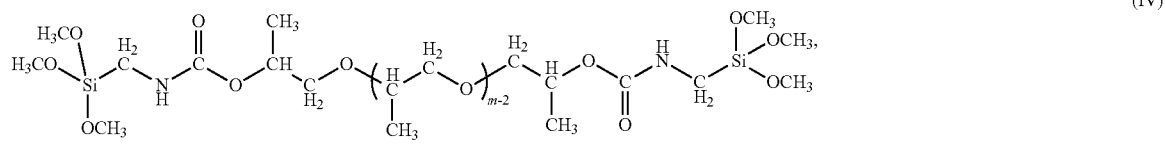

(IV)

(V) (VI)

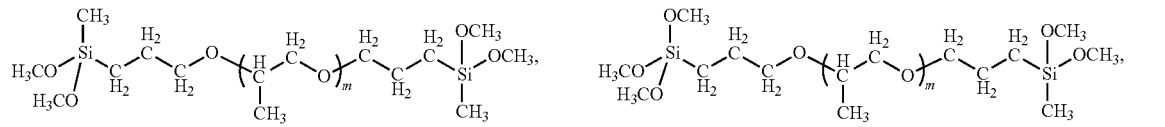

(VII)

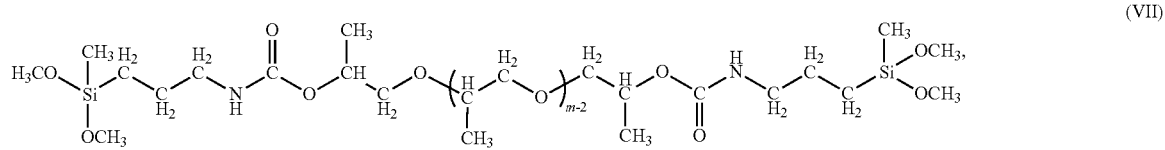

(VIII)

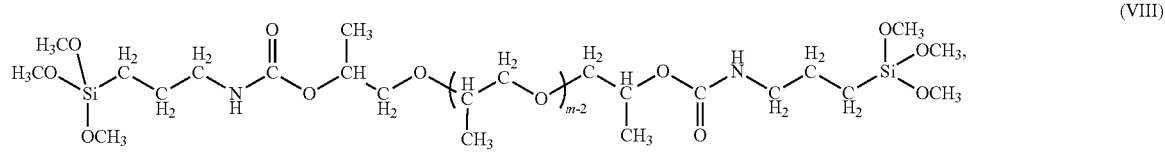

(IX)

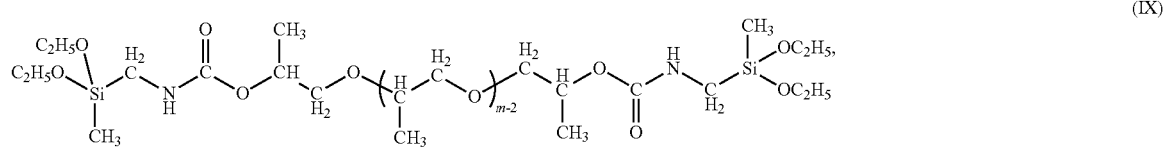

(X)

(XI) (XII)

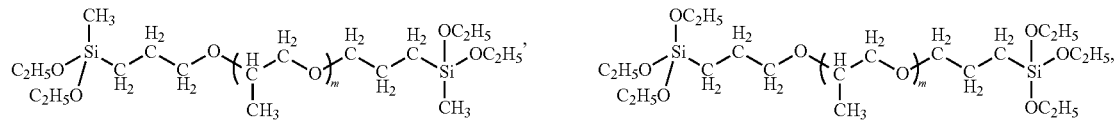

(XIII)

(XIV)

where m has the definition stated above, with preference being given to the compounds of the formulae (III), (IV), (VII), (VIII), (IX), (X), (XIII) or (XIV) and greater preference to (III) or (IV), most preferably (III).

The compounds (A) used inventively are commercial products or can be produced by methods common in chemistry.

Thus the polymers (A) may be prepared by known processes, such as by addition reaction, hydrosilylation, Michael addition or Diels-Alder addition, for example.

Examples of radicals $R^4$ are the examples specified above for $R^1$.

Radical $R^4$ preferably comprises monovalent, SiC-bonded hydrocarbyl radicals having 1 to 40 carbon atoms and optionally substituted by halogen atoms, by oxygen, such as epoxy radicals, or by nitrogen, such as amine radicals, for example, and more preferably comprises hydrocarbyl radicals having 1 to 40 carbon atoms, and most preferably comprises methyl, ethyl, vinyl, n-propyl, isopropyl, 1-n-butyl, 2-n-butyl, isobutyl, tert-butyl, n-hexyl, n-octyl, 2,2,4-trimethylpentyl, n-decyl, n-dodecyl, n-tetradecyl, n-hexadecyl, n-octadecyl, n-eicosyl, n-docosyl, n-tetracosyl, n-hexacosyl, n-octacosyl, n-triacontyl, n-dotriacontyl or n-tetracontyl radicals.

Examples of radical $R^5$ are hydrogen or the examples specified for radical $R^1$ Radical $R^5$ preferably comprises hydrogen or alkyl radicals having 1 to 16 carbon atoms, optionally substituted by halogen atoms, and more preferably comprises alkyl radicals having 1 to 4 carbon atoms, and most preferably comprises the methyl or ethyl radical.

The organosilicon compounds (B) of the invention are preferably those consisting of units of the formula (II).

In the silicon compounds (B) used inventively, a is preferably 0 or 1 in at least 50%, more preferably in at least 60%, of all units of the formula (II).

In the silicon compounds (B) used inventively, a is preferably 1 in at least 50%, more preferably in at least 60%, of all units of the formula (II).

The silicon compounds (B) preferably have a weight-average Mw of 500 to 9000 g/mol, more preferably 1000 to 9000 g/mol, and most preferably of 1500 to 7000 g/mol.

The silicon compounds (B) preferably have a number-average Mn of 500 to 3500 g/mol, more preferably 1000 to 9000 g/mol, and most preferably of 1000 to 2500 g/mol.

The silicon compounds (B) preferably have polydispersities Mw/Mn of 1 to 4, more preferably of 1.2 to 3.6.

In the present invention, weight-average Mw and number-average Mn are determined by gel permeation chromatography (GPC or Size Exclusion Chromatography (SEC)) in accordance with DIN 55672-1, using polystyrene standard and refractive index detector (RI detector). Unless otherwise shown, THF is used as eluent for phenyl-containing components, and toluene is used as eluent for non-phenyl-containing components, and the analyses are carried out at a column temperature of 45° C. The polydispersity is the ratio Mw/Mn.

Examples of silicon compounds (B) comprising units of the formula (II) are $(MeSiO_{3/2})_{0.88}(MeSi(OH)O_{2/2})_{0.05}(MeSi(OEt)O_{2/2})_{0.06}(Me_2SiO_{2/2})_{0.01}$ where Mw=6600 g/mol, Mn=2000 g/mol and Mw/Mn=3.3;

$(MeSiO_{3/2})_{0.86}(MeSi(OH)O_{2/2})_{0.02}(MeSi(OEt)O_{2/2})_{0.10}(Me_2SiO_{2/2})_{0.02}$ where Mw=10000 g/mol, Mn=2300 g/mol and Mw/Mn=4.3;

$(MeSiO_{3/2})_{0.71}(MeSi(OH)O_{2/2})_{0.03}(MeSi(OEt)O_{2/2})_{0.05}(Me_2SiO_{2/2})_{0.21}$ where Mw=4500 g/mol, Mn=1900 g/mol and Mw/Mn=2.4;

$(MeSiO_{3/2})_{0.88}(MeSi(OH)O_{2/2})_{0.05}(MeSi(OMe)O_{2/2})_{0.06}(Me_2SiO_{2/2})_{0.01}$ where Mw=9000 g/mol, Mn=2300 g/mol and Mw/Mn=3.9;

$(MeSiO_{3/2})_{0.33}(MeSi(OH)O_{2/2})_{0.05}(MeSi(OEt)O_{2/2})_{0.01}(Me_2SiO_{2/2})_{0.06}$ $(PhSiO_{3/2})_{0.24}(PhSi(OH)O_{2/2})_{0.28}(PhSi(OEt)O_{2/2})_{0.03}$ where Mw=3250 g/mol, Mn=1300 g/mol and Mw/Mn=2.5;

$(MeSiO_{3/2})_{0.33}(MeSi(OH)O_{2/2})_{0.04}(MeSi(OEt)O_{2/2})_{0.02}(Me_2SiO_{2/2})_{0.06}$ $(PhSiO_{3/2})_{0.34}(PhSi(OH)O_{2/2})_{0.17}(PhSi(OEt)O_{2/2})_{0.04}$ where Mw=2920 g/mol, Mn=1450 g/mol and Mw/Mn=2.0;

$(MeSiO_{3/2})_{0.34}(MeSi(OH)O_{2/2})_{0.03}(MeSi(OEt)O_{2/2})_{0.02}(PhSiO_{3/2})_{0.45}$ $(PhSi(OH)O_{2/2})_{0.13}(PhSi(OEt)O_{2/2})_{0.03}$

Mw=4700 g/mol, Mn=1800 g/mol and Mw/Mn=2.6;

$(MeSiO_{3/2})_{0.27}(MeSi(OH)O_{2/2})_{0.03}(PhSiO_{3/2})_{0.34}(PhSi(OH)O_{2/2})_{0.14}$ $PhSi(OEt)O_{2/2})_{0.02}(PhMeSiO_{2/2})_{0.17}(PhMeSi(OH)O_{1/2})_{0.03}$ where Mw=2400 g/mol, Mn=1200 g/mol and Mw/Mn=2.0;

$(PhSiO_{3/2})_{0.45}(PhSi(OH)O_{2/2})_{0.44}(PhSi(OEt)O_{2/2})_{0.09}(PhSi(OH)_2O_{1/2})_{0.02}$ where Mw=2900 g/mol, Mn=1500 g/mol and Mw/Mn=1.9;

$(PhSiO_{3/2})_{0.48}(PhSi(OH)O_{2/2})_{0.17}(PhSi(OEt)O_{2/2})_{0.02}(CH_3(CH_2)_2SiO_{3/2})_{0.25}(CH_3(CH_2)_2Si(OH)O_{2/2})_{0.08}$ where Mw=1800 g/mol, Mn=1250 g/mol and Mw/Mn=1.4;

$(PhSiO_{3/2})_{0.24}(PhSiO_{2/2}(OCH_3))_{0.52}(PhSiO_{1/2}(OCH_3)_2)_{0.24}$ where Mw=986 g/mol Mn=765 g/mol, Mw/Mn=1.29;

$(MeSiO_{3/2})_{0.32}(MeSi(OH)O_{2/2})_{0.06}(MeSi(OEt)O_{2/2})_{0.01}(Me_2SiO_{2/2})_{0.06}(PhSiO_{3/2})_{0.23}(PhSi(OH)O_{2/2})_{0.29}(PhSi(OEt)O_{2/2})_{0.03}$ where Mw=1700 g/mol, Mn=1200 g/mol and Mw/Mn=1.4;

$(PhSiO_{3/2})_{0.50}(PhSi(OH)O_{2/2})_{0.15}(PhSi(OEt)O_{2/2})_{0.02}(CH_3(CH_2)_2SiO_{3/2})_{0.26}(CH_3(CH_2)_2Si(OH)O_{2/2})_{0.07}$ where Mw=2800 g/mol, Mn=1200 g/mol and Mw/Mn=2.3;

$(MeSiO_{3/2})_{0.81}(MeSi(OH)O_{2/2})_{0.04}(MeSi(OEt)O_{2/2})_{0.05}(Me_2SiO_{2/2})_{0.10}$ where Mw=6500 g/mol, Mn=1900 g/mol and Mw/Mn=3.4;

where Me is methyl radical, Et is ethyl radical, and Ph is phenyl radical.

$(SiO_{4/2})_{0.50}(Me_3SiO_{1/2})_{0.39}(Si(OEt)O_{3/2})_{0.06}(Si(OEt)_2O_{2/2})_{0.02}(Si(OEt)_3O_{1/2})_{0.01}(Si(OH)O_{3/2})_{0.02}$ where Mw=7400 g/mol, Mn=3100 g/mol and Mw/Mn=2.4;

$(SiO_{4/2})_{0.46}(Me_3SiO_{1/2})_{0.43}(Si(OEt)O_{3/2})_{0.07}(Si(OEt)_2O_{2/2})_{0.02}-(Si(OEt)_3O_{1/2})_{0.01}(Si(OH)O_{3/2})_{0.01}$ where Mw=1400 g/mol, Mn=900 g/mol and Mw/Mn=1.6;

$(SiO_{4/2})_{0.46}(Me_3SiO_{1/2})_{0.37}(ViMe_2SiO_{1/2})_{0.06}(Si(OEt)O_{3/2})_{0.07}(Si(OEt)_2O_{2/2})_{0.02}(Si(OEt)_3O_{1/2})_{0.01}(Si(OH)O_{3/2})_{0.04}$ where Mw=5300 g/mol, Mn=2600 g/mol and Mw/Mn=2.0;

$(SiO_{4/2})_{0.38}(Me_3SiO_{1/2})_{0.42}(ViMe_2SiO_{1/2})_{0.06}(Si(OEt)O_{3/2})_{0.07}(Si(OEt)_2O_{2/2})_{0.02}(Si(OEt)_3O_{1/2})_{0.01}(Si(OH)O_{3/2})_{0.04}$ where Mw=2600 g/mol, Mn=1600 g/mol and Mw/Mn=1.6;

$(MeSiO_{3/2})_{0.37}(MeSi(OEt)O_{2/2})_{0.46}(MeSi(OEt)_2O_{1/2})_{0.17}$ where Mw=2400 g/mol, Mn=900 g/mol and Mw/Mn=2.7;

$(MeSiO_{3/2})_{0.37}(MeSi(OH)O_{2/2})_{0.01}(MeSi(OEt)O_{2/2})_{0.46}(MeSi(OEt)_2O_{1/2})_{0.15}(Me_2SiO_{2/2})_{0.01}$ where Mw=2400 g/mol, Mn=900 g/mol and Mw/Mn=2.7, $(MeSiO_{3/2})_{0.29}(MeSi(OH)O_{2/2})_{0.01}(MeSi(OMe)O_{2/2})_{0.47}(MeSi(OMe)_2O_{1/2})_{0.23}$ where Mw=2300 g/mol, Mn=600 g/mol and Mw/Mn=3.8;

$(MeSiO_{3/2})_{0.32}(MeSi(OMe)O_{2/2})_{0.48}(MeSi(OMe)_2O_{1/2})_{0.20}$ where Mw=3300 g/mol, Mn=900 g/mol and Mw/Mn=3.7;

$(PhSiO_{3/2})_{0.23}(PhSi(OMe)O_{2/2})_{0.51}(PhSi(OMe)_2O_{1/2})_{0.26}$ where Mw=1000 g/mol, Mn=700 g/mol and Mw/Mn=1.4;

$(MeSiO_{3/2})_{0.10}(MeSi(OMe)O_{2/2})_{0.17}(MeSi(OMe)_2O_{1/2})_{0.03}(PhSiO_{3/2})_{0.15}(PhSi(OMe)O_{2/2})_{0.31}(PhSi(OMe)_2O_{1/2})_{0.20}(Me_2SiO_{2/2})_{0.04}$ where Mw=1800 g/mol, Mn=900 g/mol and Mw/Mn=2.0;

$(MeSiO_{3/2})_{0.10}(MeSi(OMe)O_{2/2})_{0.15}(MeSi(OMe)_2O_{1/2})_{0.03}(MeSi(O(CH_2)_3CH_3)O_{2/2})_{0.03}(PhSiO_{3/2})_{0.15}(PhSi(OMe)O_{2/2})_{0.24}(PhSi(OMe)_2O_{1/2})_{0.15}(PhSi(O(CH_2)_3CH_3)O_{2/2})_{0.06}(PhSi(OMe)(O(CH_2)_3CH_3)O_{1/2})_{0.04}(PhSi(O(CH_2)_3CH_3)_2O_{1/2})_{0.01}(Me_2SiO_{2/2})_{0.04}$ where Mw=1400 g/mol, Mn=800 g/mol and Mw/Mn=1.8;

$(i\text{-}OctSi(OMe)(OH)O_{1/2})_{0.01}(i\text{-}OctSi(OMe)O_{2/2})_{0.10}(i\text{-}OctSi-(OMe)_2O_{1/2})_{0.16}(MeSiO_{3/2})_{0.26}(MeSi(OMe)O_{2/2})_{0.36}(MeSi(OMe)_2O_{1/2})_{0.11}$ where Mw=3000 g/mol, Mn=1500 g/mol and Mw/Mn=2.0;

$(Si(OEt)_2O_{2/2})_{0.42}(Si(OEt)O_{3/2})_{0.19}(Si(OEt)_3O_{1/2})_{0.30}$ where Mw=1000 g/mol, Mn=800 g/mol and Mw/Mn=1.2;

$(Si(OEt)_2O_{2/2})_{0.48}(Si(OEt)O_{3/2})_{0.35}(Si(OEt)_3O_{1/2})_{0.09}(SiO_{4/2})_{0.09}$ where Mw=1400 g/mol, Mn=900 g/mol and Mw/Mn=1.6;

$(MeSiO_{3/2})_{0.23}(i\text{-}OctSiO_{3/2})_{0.06}(MeSi(OMe)O_{2/2})_{0.35}(i\text{-}OctSi(OMe)O_{2/2})_{0.09}(MeSi(OEt)_2O_{1/2})_{0.19}(i\text{-}OctSi(OEt)_2O_{1/2})_{0.08}$ where Mw=1400 g/mol, Mn=600 g/mol and Mw/Mn=2.3; and $(MeSiO_{3/2})_{0.22}(i\text{-}OctSiO_{3/2})_{0.05}(MeSi(OH)O_{2/2})_{0.01}(MeSi(OMe)O_{2/2})_{0.33}(i\text{-}OctSi(OMe)O_{2/2})_{0.11}(MeSi(OMe)_2O_{1/2})_{0.20}(i\text{-}OctSi(OMe)_2O_{1/2})_{0.08}$ where Mw=1500 g/mol, Mn=650 g/mol and Mw/Mn=2.3;

where Me is the methyl radical, Vi is the vinyl radical, Et is the ethyl radical, i-oct is the 2,4,4-trimethylpentyl radical, and Ph is the phenyl radical.

Silicon compounds (B) are preferably compounds comprising units of the formula (II) where $R^4$ is a methyl, 2,4,4-trimethylpentyl radical or phenyl radical and $R^5$ is a methyl or ethyl radical, more preferably compounds consisting of units of the formula (II) where $R^4$ is a methyl or phenyl radical and $R^5$ is a methyl or ethyl radical, and most preferably compounds consisting of units of the formula (II) where $R^4$ is the phenyl radical and $R^5$ is a methyl or ethyl radical.

The compounds (B) used inventively are commercial products or can be prepared by methods common in chemistry.

The amount of component (B) in the dispersions of the invention may vary within wide ranges and is guided primarily by the type of application for the dispersion, and is preferably 10 to 3000 parts by weight, more preferably 10 to 1000 parts by weight, of component (B), based on 100 parts by weight of component (A).

Thus component (B) is preferably used in amounts of 10 to 100 parts by weight, based on 100 parts by weight of component (A), if the dispersions of the invention are used in areas where high elasticity is important, such as paints, for example.

Where the dispersions of the invention are employed for applications where high strengths are required, such as in mortar applications, for example, the amount of component (B) is preferably more than 100 to 1000 parts by weight, based on 100 parts by weight of component (A).

The emulsifiers (C) may be any compounds suitable for emulsifying components (A) and (B) in water. They may be nonionic, anionic, cationic or amphoteric surfactants or else polymers such as polyvinyl alcohols, cellulose ethers or polyacrylates, for example.

Examples of cationic emulsifiers are quaternary ammonium compounds which carry at least one substituted or unsubstituted hydrocarbyl radical having at least 10 carbon atoms, such as dodecyldimethylammonium chloride, tetradecyltrimethylammonium bromide, stearyltrimethylammonium chloride, distearyldimethylammonium chloride, cetyltrimethylammonium chloride, behenyltrimethylammonium bromide, dodecylbenzyldimethylammonium chloride, trimethylbenzylammonium methosulfate and trimethylbenzylammonium chloride.

Further examples of cationic emulsifiers are quaternary imidazolinium compounds which carry at least one substituted or unsubstituted hydrocarbyl radical having at least 10 carbon atoms, such as 1-methyl-2-stearyl-3-stearylamidoethylimidazolinium methosulfate, 1-methyl-2-norstearyl-3-stearylamidoethylimidazolinium methosulfate, 1-methyl-2-oleyl-3-oleylamidoethylimidazolinium methosulfate, 1-methyl-2-stearyl-3-methylimidazolinium methosulfate, 1-methyl-2-behenyl-3-methylimidazolinium methosulfate and 1-methyl-2-dodecyl-3-methylimidazolinium methosulfate.

Examples of anionic emulsifiers are alkyl sulfates, alkylsulfonates, alkylbenzenesulfonates, alkyl phosphates, alkylphosphonates, and alkylsulfosuccinates.

Preferred emulsifiers (C) used in the mixtures of the invention are nonionic emulsifiers. Examples of the nonionic emulsifiers (C) are sorbitan fatty acid esters, ethoxylated sorbitan fatty acid esters, ethoxylated fatty acids, ethoxylated linear or branched alcohols having 10 to 20 carbon atoms, ethoxylated alkylphenols, pentaerythritol fatty acid esters, glycerol esters, and alkylpolyglycosides.

The nonionic emulsifiers (C) are preferably sorbitan fatty acid esters, ethoxylated sorbitan fatty acid esters, ethoxylated fatty acids, ethoxylated linear or branched alcohols having 10 to 20 carbon atoms, and ethoxylated triglycerides.

The dispersions of the invention preferably contain no ethoxylated alkylphenols, since the latter are known not to be eco-friendly.

Preference is given as component (C) to using mixtures of nonionic emulsifiers of which at least one emulsifier has an HLB of greater than or equal to 12. In this case the fraction of emulsifiers having an HLB of greater than or equal to 12 in the emulsifier mixture (C) is preferably at least 30 wt %.

The HLB is an expression of the equilibrium between hydrophilic and hydrophobic groups in an emulsifier. The definition of the HLB and also methods for determining it are general knowledge and are described for example in Journal of Colloid and Interface Science 298 (2006) 441-450 and also the references cited therein.

Examples of the nonionic emulsifiers (C) used which have an HLB of greater than or equal to 12 are (HLBs according to manufacturer, POE stands for polyoxyethylene):

| Chemical name | HLB | Manufacturer (ex.) | Trade name |
|---|---|---|---|
| POE(20) sorbitan monostearate | 14.9 | Croda[1] | Tween ® 60 |
| POE(20) sorbitan monooleate | 15.0 | Croda[1] | Tween ® 80 |
| POE(20) sorbitan monolaurate | 16.7 | Croda[1] | Tween ® 20 |
| POE(200) castor oil | 18.1 | Croda[1] | Etocas ® 200 |
| POE(40) stearate | 16.9 | Croda[1] | Myrj ® 52 |
| POE(23) lauryl ether | 16.9 | Croda[1] | Brij ® L23 |
| POE(10) isotridecyl ether | 13.7 | Sasol[2] | Marlipal ® O13/100 |
| POE(12) isotridecyl ether | 14.5 | Sasol[2] | Marlipal ® O13/120 |
| POE(16) isotridecyl ether | 15.6 | BASF[3] | Arlypon ® IT 16 |

[1] Croda International Plc, Cowick Hall, Snaith Goole East Yorkshire UK;
[2] Sasol Germany GmbH, D-Marl;
[3] BASF SE, D-Ludwigshafen.

Examples of nonionic emulsifiers having an HLB<12 which can be used are (HLBs according to manufacturer or table 3 in the source identified above, POE stands for polyoxyethylene):

| Chemical name | HLB | Manufacturer (ex.) | Trade name |
|---|---|---|---|
| Sorbitan monostearate | 4.7 | Croda[1] | Span ® 60 |
| Sorbitan monooleate | 4.3 | Croda[1] | Span ® 80 |
| Sorbitan monolaurate | 8.6 | Croda[1] | Span ® 20 |
| POE(4) lauryl ether | 9.7 | Croda[1] | Brij ® L4 |
| POE(6) isotridecyl ether | 11.4 | Sasol[2] | Marlipal ® O13/60 |
| POE(5) isotridecyl ether | 10.5 | BASF[3] | Lutensol ® TO5 |
| POE(4) stearyl ether | 7.5 | BASF[3] | Arlypon ® SA 4 |

[1] Croda International Plc, Cowick Hall, Snaith Goole East Yorkshire UK;
[2] Sasol Germany GmbH, D-Marl;
[3] BASF SE, D-Ludwigshafen.

The dispersions of the invention preferably comprise component (C) in amounts of 1 to 50 parts by weight, more preferably of 2 to 10 parts by weight, based in each case on 100 parts by weight of the total weight of component (A) and component (B).

Water (D) which can be used is any kind of water useful for preparing dispersions. Water (D) is preferably partly or fully demineralized water, distilled or (repeatedly) redistilled water, water for medical or pharmaceutical uses, such as purified water, for example (aqua purificata according to Pharm. Eur.).

The water (D) preferably has a conductivity of less than 50 µS/cm, more preferably less than 10 µS/cm, most preferably less than 1.3 µS/cm, in each case at 20° C. and 1013 hPa.

The dispersions of the invention preferably comprise water (D) in amounts of 10 to 200 parts by weight, more preferably 20 to 100 parts by weight, based in each case on 100 parts by weight of the total weight of component (A) and component (B).

In the dispersions of the invention, water (D) is preferably the continuous phase.

Examples of optionally employed catalysts (E) are all metal-free condensation catalysts known to date, such as acids, as for example carboxylic acids, dicarboxylic acids, organophosphoric acid and the mono- and diesters thereof, phosphonic acids and the monoesters thereof, and diorganophosphinic acids, boric acid, ammonium salts and anhydrides of carboxylic acids; bases, as for example alkaline metal and alkaline earth metal hydroxide; organic nitrogen compounds, as for example triorganyloxyamines, monoorganylamines, diorganylamines (including cyclic systems such as piperidine, piperazine, pyrrolidine, homopiperazine, 7-azabicyclo[2.2.1]heptane), triorganylamines (including cyclic systems such as DABCO (1,4-diazabicyclo[2.2.2]octane), 4,5-dihydro-1H-imidazole, 2-organyl-4,5-dihydro-1H-imidazoles), and also organylamidines (including cyclic systems such as 1,4,5,6-tetrahydropyrimidine, 2-organyl-1,4,5,6-tetrahydropyrimidines, 1,5-diazabicyclo[4.3.0]non-5-ene, 1,8-diazabicyclo[5.4.0]undec-7-ene, 1,5,7-triazabicyclo[4.4.0]dec-5-ene, 7-methyl-1,5,7-triazabicyclo[4.4.0]dec-5-ene), aminomethanamidine, 1-methyl-guanidine, N,N'-dimethylguanidine, N,N,N',N'-tetramethylguanidine, N,N,N',N'-tetramethyl-N''-arylguanidines, N,N,N',N'-tetramethyl-N''-[4-morpholinyl(phenylimino)methyl]guanidine, 1-methyl-3-nitroguanidine, 1,8-bis(tetramethylguanidino)-naphthalene, biguanide and 1-methylbiguanide, and also salts of the stated acids with the stated organic nitrogen compounds.

The optionally employed catalyst (E) preferably comprises carboxylic acids, dicarboxylic acids, organophosphoric acid and the mono- and diesters thereof, phosphonic acids and the monoesters thereof, and diorganophosphinic acids, organic nitrogen compounds, as for example triorganyloxyamines, monoorganylamines, diorganylamines, amidines, and guanidines, or salts of the stated acids with the stated nitrogen compounds.

With particular preference the optionally employed catalyst (E) comprises organic nitrogen compounds.

The optionally employed catalysts (E) preferably have a solubility in fully demineralized water having a conductivity of less than 1.3 µS/cm of at least 0.1 g per 100 g water, more preferably at least 1 g per 100 g water, in each case at 20° C. and 1013 hPa.

More particularly preferred as optionally employed catalysts (E) are organic nitrogen compounds whose 0.1 wt % strength solution in fully demineralized water having a conductivity of less than 1.3 µS/cm has a pH of greater than 7.

The optionally employed organic nitrogen compounds (E) have an n-octanol/water partition coefficient $K_{ow}$ of preferably <1 at 20° C. and 1013 hPa. The determination of the $K_{ow}$ is general knowledge. In this regard, reference is made to J. Sangster, Octanol-Water Partition Coefficients: Fundamentals and Physical Chemistry, Vol. 2 of Wiley Series in Solution Chemistry, John Wiley & Sons, Chichester, 1997. The determination is made according to the shake-flask method (page 57 ff.); for analysis of the purity of the substance under determination, acid-base titration is used.

If the compositions of the invention do include catalysts (E), the amounts are preferably 0.001 to 2 parts by weight, more preferably 0.1 to 2 parts by weight, and most preferably 0.01 to 1 part by weight, based in each case on 100 parts by weight of the total weight of component (A) and component (B). The compositions of the invention preferably do comprise catalyst (E).

The fillers (F) employed optionally in accordance with the invention may be any desired fillers known to date.

Examples of fillers (F) are quartz powder, quartz granules, fused quartz powders, fused silica powders, glass powders, diatomaceous earth, silicates, calcium silicate, magnesium silicate, zirconium silicate, talc, kaolin, zeolites, metal oxide powders, such as aluminum, titanium, iron or zinc oxides and/or their mixed oxides, barium sulfate, carbonates, such as calcium carbonate (precipitated or ground; chalk, limestone, marble), magnesium carbonate and calcium magnesium carbonate (dolomite), pyrogenically prepared silica, precipitated silica, aluminum trihydroxide, magnesium hydroxide, fibrous fillers, such as wollastonite, montmorillonite, bentonite, and also chopped and/or ground fibers of glass (chopped glass fibers), mineral wool or plastic.

Preferably the optionally employed fillers (F) comprise quartz powders, fused silica powders, glass powders, diatomaceous earth, talc, kaolin, zeolites, metal oxide powders, such as aluminum, titanium, iron or zinc oxides and/or their mixed oxides, barium sulfate, carbonates, such as calcium carbonate (precipitated or ground, from natural sources such as chalk, limestone, marble), magnesium carbonate and calcium magnesium carbonate (dolomite), fibrous fillers, such as wollastonite, montmorillonite, bentonite, and also chopped and/or ground fibers of glass (chopped glass fibers), mineral wool or plastic, particular preference being given to quartz powders, talc, kaolin, zinc oxide, barium sulfate, carbonates, such as calcium carbonate (precipitated or ground, from natural sources such as chalk, limestone, marble), magnesium carbonate and calcium magnesium carbonate (dolomite), fibrous fillers, such as wollastonite, montmorillonite, bentonite, and also chopped and/or ground fibers of glass (chopped glass fibers), mineral wool or plastic.

The fillers (F) employed optionally in accordance with the invention preferably have an average particle size D50 of 0.1 µm to 250 µm, more preferably 0.1 µm to 25 µm.

The analysis of the particle size distribution of the fillers in the range from approximately 0.02 to 500 µm is carried out preferably with a CILAS 1064 PARTICLE SIZE ANALYZER from Cilas.

If the dispersions of the invention do include fillers (F), the amounts involved are preferably 10 to 150 parts by weight, more preferably 10 to 90 parts by weight, and most preferably 10 to 50 parts by weight, based in each case on 100 parts by weight of the total weight of the component (A) and component (B). In a further preferred variant, fillers (F) are preferably present in amounts of 500 to 1800 parts by weight, more preferably 600 to 1400 parts by weight, based in each case on 100 parts by weight of the total weight of component (A) and component (B). The dispersions of the invention preferably do comprise fillers (F).

The additives (G) employed optionally in the dispersions of the invention may be any adjuvants which are useful in aqueous dispersions, such as, for example, pigments, dyes or fragrances, stabilizers, flow control assistants, light stabilizers, and preservatives, preference being given to the addition of light stabilizers and preservatives.

Examples of optionally employed preservatives (G) are methylisothiazolinone, chloromethylisothiazolinone, benzylisothiazolinone, phenoxyethanol, methylparaben, ethylparaben, propylparaben, butylparaben, isobutylparaben, alkali metal benzoates, alkal metal sorbates, iodopropynyl butylcarbamate, benzyl alcohol, and 2-bromo-2-nitropropane-1,3-diol.

Examples of optionally employed light stabilizers (G) are antioxidants, UV stabilizers, such as those known as "HALS compounds", for example, and UV absorbers, such as those from the group of the benzotriazoles.

If the dispersions of the invention do include additives (G), the amounts used may vary within wide ranges, depending on the nature of the additive and on the use of the dispersions of the invention. Amounts involved are preferably 0.0005 to 2 parts by weight, based on 100 parts by weight of the total weight of component (A) and component (B). If the additives (G) comprise flow control assistance, such as 2,2,4-trimethyl-1,3-pentanediol monoisobutyrate, then in a further preferred variant preferred amounts may be 50 to 150 parts by weight, based on 100 parts by weight of the total weight of component (A) and component (B). The dispersions of the invention preferably do comprise additives (G).

The dispersions of the invention are preferably those comprising,
based in each case on 100 parts by weight of the total weight of components (A) and (B),
2 to 10 parts by weight of component (C),
20 to 100 parts by weight of component (D),
10 to 50 parts by weight of component (F),
optionally 0.001 to 2 parts by weight of component (E), and
optionally 0.0005 to 2 parts by weight of component (G) selected from preservatives and light stabilizers,
with the proviso that the weight ratio of component (B) to component (A) is in the range from 0.1:1 to 1:1.

These dispersions can be used with preference as exterior masonry paints.

With further preference, the dispersions of the invention are those comprising,
based in each case on 100 parts by weight of the total weight of components (A) and (B),
2 to 10 parts by weight of component (C),
20 to 100 parts by weight of component (D),
600 to 1400 parts by weight of component (F),
optionally 0.001 to 2 parts by weight of component (E), and
optionally 0.0005 to 2 parts by weight of (G) selected from preservatives,
with the proviso that the weight ratio of component (B) to component (A) is 1:1 to 10:1.

These dispersions can preferably be employed as joining mortars.

The dispersions of the invention preferably contain no other constituents than components (A), (B), (C), and (D), and also, optionally (E), (F), and (G).

The components used inventively may in each case be one kind of such a component or else a mixture of at least two kinds of a respective component.

The dispersions of the invention are preferably oil-in-water emulsions, or are dispersions based on oil-in-water emulsions.

The dispersions of the invention are dilutable with water in any proportions.

The dispersions of the invention can be produced by any desired methods known to date.

A further subject of the present invention is a method for producing the dispersions of the invention by mixing components (A), (B), and optionally (C) and further components and subsequently emulsifying the resulting mixture by adding water (D) and also optionally components (C) and optionally further components, with the proviso that component (C) is used.

In one preferred embodiment of the method of the invention, first components (A), (B), and (C) are mixed with one another and then the resulting mixture is emulsified by addition of water (D), with water (D) preferably constituting the continuous phase.

In a further preferred embodiment of the method of the invention, components (A) and (B) are mixed with one another and then a mixture of components (C) and (D) and also, optionally, further components is added, followed by emulsification, where water (D) preferably constitutes the continuous phase.

In the method of the invention, the optional constituents are preferably added after the dispersion has been prepared from components (A), (B), (C), and (D), this dispersion preferably being an oil-in-water emulsion. Alternatively the optional constituents may be added as a mixture with water (D).

In one particularly preferred embodiment of the method of the invention
in a 1st step
components (A) and (B) are mixed by stirring and/or homogenizing,
in a 2nd step
components (C) and (D) are added to the mixture obtained in the 1st step, and an emulsion is produced by rapid stirring,
optionally in a 3rd step
further water (D) is added, and
optionally in a 4th step
further substances, as selected for example from components (E), (F), and (G), are mixed in, optionally as a premix with further water (D).

In the first step of the method of the invention, components (A) and (B) are mixed with one another by stirring, preferably in commercial mixing assemblies with paddle, anchor or planetary stirrers, dissolver disks or centrifugal mixers.

In the second step of the method of the invention, the mixture of (A) and (B) with the further components (C) and (D) is mixed with one another by stirring and/or homogenizing, in any order, for example, the peripheral speed of the stirrer and/or rotor/stator homogenizer being preferably greater than 5 m/s, more preferably greater than 10 m/s, and most preferably 5 to 50 m/s. In the second step, preferably, the mixture of (A) and (B) is first mixed with component (C) and then water (D) is added in portions with vigorous mixing.

The emulsion obtained in the second step of the method of the invention is preferably an oil-in-water emulsion.

The emulsion of components (A), (B), (C), and (D) that is obtained in the second step is preferably of high viscosity and not flowable. In this case preferably only a partial amount of water (D) is used. With particular preference, in the second step, sufficient water (D) is used to give the emulsion obtained in the second step a yield point (in accordance with DIN 53019-1 and cited standards) of greater than 10 Pa, preferably greater than 100 Pa, and most preferably greater than 1000 Pa.

The second step of the method of the invention is preferably carried out at temperatures at 5 to 80° C., more preferably 10 to 50° C., under the pressure of the surrounding atmosphere, in other words between 900 and 1100 hPa, or under an elevated pressure of up to 20,000 hPa, more particularly of up to 10,000 hPa.

The duration of the second step of the invention is preferably less than 4 hours, more preferably less than 2 hours, and most preferably 5 to 60 minutes.

The mixture obtained in the second step of the method of the invention preferably has a particle size (average of the volume distribution) of less than 5 µm, more preferably 0.1 to 1 µm. The particle size here is preferably determined using a Malvern Mastersizer® 2000 or 3000 according to ISO 13320:2009, the evaluation taking place according to the Mie theory with a refractive index of 1.390 for the particle, a refractive index of 1.330 for the medium and an absorption constant of 0.01.

In the third step of the invention, carried out optionally, the emulsion obtained in the second step, particularly if its consistency ranges from high viscosity to sag-resistant, is diluted with further water (D), with stirring and/or homogenizing, so as to form a flowable emulsion which comprises preferably more than 30 parts of water (D) per 100 parts by weight of the total weight of component (A) and component (B).

In the fourth step, carried out optionally, further components, selected from components (E), (F), and (G), are then added, and may in each case also have been premixed with (D).

The stirring and/or homogenizing in the third and in the fourth step may take place under the same conditions as described for the first step, such as with simple, slow-running mixers, for instance.

The first step of the method of the invention is preferably carried out at temperatures of 5 to 100° C., more particularly 10 to 70° C., and at the pressure of the surrounding atmosphere, in other words between 900 and 1100 hPa, or at a reduced pressure of up to 10 hPa, more preferably of up to 100 hPa.

The second step of the method of the invention is carried out under the pressure of the surrounding atmosphere, in other words at approximately 1010 hPa, and at room temperature, in other words approximately 20° C., or at a temperature which comes about when the reactance are combined at room temperature without additional heating or cooling.

The third and fourth steps of the invention carried out optionally, are carried out in each case independently of one another at temperatures of preferably 5 to 50° C., more preferably 10 to 30° C., under the pressure of the surrounding atmosphere, in other words between 900 and 1100 hPa. The third and fourth steps may take place in the same vessel as the second method step.

The duration of the third step, carried out optionally in accordance with the invention, is preferably less than 4 hours, more preferably less than 2 hours, and most preferably 5 to 60 minutes.

In the method of the invention, the third step preferably is carried out.

In the method of the invention, the fourth step preferably is carried out.

In the method of the invention, the third and the fourth steps preferably are carried out.

The individual steps of the method of the invention may each individually be carried out continuously, discontinuously or semi-continuously, and even individual steps can be combined with one another in a continuous regime.

The dispersions of the invention are preferably milky white or else, depending on filler and pigment, are colored.

The consistency of the dispersions of the invention may vary within wide ranges, and extends from that of a thin liquid to a high-viscosity paste, or even that resembling putty.

The dispersions of the invention preferably have a pH of 4 to 8, more preferably 4 to 6.

The dispersions of the invention have solids contents of 45 to 90 wt %.

The solids contents are preferably measured by weighing about 2 g of the sample under measurement to an accuracy of 0.0001 g into a cylindrical metal vessel having a smooth base, with a diameter of 30 mm and a height of 40 mm. The metal vessel is then stored in a drying cabinet at 105° C. for 2 hours under the pressure of the surrounding atmosphere, i.e., 900 to 1100 hPa. When the hot storage is over, the sample is taken from the drying cabinet and cooled to room temperature in an empty desiccator. The sample is subsequently weighed again to an accuracy of 0.0001 g. The solids content is the ratio formed by dividing the final mass by the initial mass, expressed in wt %.

The dispersions of the invention cure even at room temperature within a short time to form elastomers, following complete or partial removal, preferably evaporation, of the water. Curing may also be accelerated by absorption of the water by an absorbent and/or hygroscopic substrate, such as wood, for example, or porous mineral substances, such as brick, for example.

A further subject of the invention are shaped articles produced by crosslinking the dispersions of the invention, after the water has been completely or partially removed.

The shaped articles of the invention are preferably coatings or sealants, more particularly with high flexural strengths but only low extensibility.

The coatings of the invention are preferably highly elastic membranes which are able to serve for sealing porous building materials such as concrete, or can be employed for closing and bridging cracks in building materials such as concrete.

The shaped articles of the invention are preferably produced by applying the dispersion of the invention to the surface of a substrate, such as that of a mineral building material, for example, and allowing the water to evaporate, thereby setting in train the curing.

The dispersions of the invention can be employed wherever dispersions based on siloxanes are useful such as coatings for building applications, especially wall paints and floor paints, sealants and filling compounds, especially joining mortars.

The dispersions of the invention have the advantage that they adhere well to many substrates, such as mineral building materials such as concrete, mortar, artificial stone, and clinker, and also tiles and glass, plastics and wood. Coating in this case may take place by known methods, such as brushing, rolling, dipping or spraying, for example. The shaped articles may be produced, for example, by introducing the dispersions of the invention by troweling into an interspace between two building materials, tiles for example, this operation being followed by the curing, triggered by evaporation of the water.

A preferred field of use is that of using the dispersions of the invention as sealants and coating materials. Examples include joint sealants in buildings, in the interior and exterior area, more particularly use as sealants or joining mortars in the sanitary and culinary areas. Examples of coatings include masonry coatings and masonry impregnation systems, elastic masonry points, textile coatings, and fabric coatings.

An advantage of the dispersions of the invention is that they are easy and inexpensive to produce.

A further advantage of the dispersions of the invention is that they are toxicologically unobjectionable and highly compatible with numerous substrates.

The dispersions of the invention have the advantage, moreover, that they adhere well to numerous substrates and produce shaped articles having hydrophobic properties, which can nevertheless be wetted again at any time with the same dispersions. The possibilities therefore include that of any time recoatability of the shaped articles with aqueous dispersions, something which constitutes a substantial advantage in practice.

The dispersions of the invention have the advantage that the mechanical properties of the shaped articles produced using them can easily be adjusted within wide limits.

In the examples which follow, all information on parts and percentages, unless otherwise indicated, is by weight. Unless indicated otherwise, the following examples are carried out under the pressure of the surrounding atmosphere, in other words at approximately 1000 hPa, and at room temperature, in other words approximately 20° C., or at a temperature which comes about when the reactants are combined at room temperature without additional heating or cooling.

EXAMPLES

Silyl-Terminated Polyether 1: α,ω-dimethoxymethylsilyl-methyl-carbamate-terminated polypropylene glycol having an average molar weight Mn of about 18,500 g/mol, available under the name GENIOSIL® STP-E30 from Wacker Chemie AG, Munich (DE);

Silyl-Terminated Polyether 2: α,ω-dimethoxymethylsilyl-methyl-carbamate-terminated polypropylene glycol having an average molar weight Mn of about 12,500 g/mol, available under the name GENIOSIL® STP-E10 from Wacker Chemie AG, Munich (DE);

$(PhSiO_{3/2})_{0.24}(PhSiO_{2/2}(OCH_3))_{0.52}(PhSiO_{1/2}(OCH_3)_2)_{0.24}$     Siloxane Resin 1:

where Mw=986 g/mol, Mn=765 g/mol and Mw/Mn=1.29;

$(MeSiO_{3/2})_{0.33}(MeSi(OH)O_{2/2})_{0.05}(MeSi(OEt)O_{2/2})_{0.01}$ $(Me_2SiO_{2/2})_{0.06}(PhSiO_{3/2})_{0.24}(PhSi(OH)O_{2/2})_{0.28}(PhSi(OEt)O_{2/2})_{0.03}$     Siloxane resin 2:

where Mw=3250 g/mol, Mn=1300 g/mol and Mw/Mn=2.5;

$(MeSiO_{3/2})_{0.33}(MeSi(OH)O_{2/2})_{0.04}(MeSi(OEt)O_{2/2})_{0.02}$ $(Me_2SiO_{2/2})_{0.06}(PhSiO_{3/2})_{0.34}(PhSi(OH)O_{2/2})_{0.17}(PhSi(OEt)O_{2/2})_{0.04}$     Siloxane resin 3:

where Mw=2920 g/mol, Mn=1450 g/mol and Mw/Mn=2.0;

$(MeSiO_{3/2})_{0.22}(i\text{-}OctSiO_{3/2})_{0.05}(MeSi(OH)O_{2/2})_{0.01}$ $(MeSi(OMe)O_{2/2})_{0.33}(i\text{-}OctSi(OMe)O_{2/2})_{0.11}(MeSi(OMe)_2O_{1/2})_{0.20}$ $(i\text{-}OctSi(OMe)_2O_{1/2})_{0.08}$     Siloxane resin 5:

where Mw=1500 g/mol, Mn=650 g/mol and Mw/Mn=2.3;

$(MeSiO_{3/2})_{0.10}(MeSi(OMe)O_{2/2})_{0.17}(MeSi(OMe)_2O_{1/2})_{0.03}(PhSiO_{3/2})_{0.15}\text{-}(PhSi(OMe)O_{2/2})_{0.31}(PhSi(OMe)_2O_{1/2})_{0.20}(Me_2SiO_{2/2})_{0.04}$     Siloxane resin 6:

where Mw=1800 g/mol, Mn=900 g/mol and Mw/Mn=2.0.

I) Production of the Mixtures of a Silyl-Terminated Polyether of the Formula (I) (Component (A)) and a Silicon Compound Containing Units of the Formula (II) (Component (B))

Example 1.1

150 g of siloxane resin 1, which is liquid at 25° C., were mixed with 150 g of silyl-terminated polyether 1 at 680 min$^{-1}$ in a LPV1 planetary mixer from PC-Laborsystem with a cross-arm stirrer as stirring tool for 10 minutes under reduced pressure at 100 mbar. This mixture was dispensed into a moisture-tight bottle.

Examples 1.2 to 1.5

The experiment of example 1.1 was repeated. Instead of the amounts of the ingredients indicated in example 1.1, the amounts compiled in table 1 were used.

Examples 1.6 to 1.11

The experiment of example 1.1 was repeated. Instead of the silyl-terminated polyether 1, silyl-terminated polyether 2 was used. The amounts of the ingredients used are compiled in table 1.

TABLE 1

| Example | Siloxane resin 1 | Silyl-terminated polyether 1 | Silyl-terminated polyether 2 |
|---|---|---|---|
| 1.2 | 120 g | 180 g | |
| 1.3 | 90 g | 210 g | |
| 1.4 | 60 g | 240 g | |
| 1.5 | 30 g | 270 g | |
| 1.6 | 210 g | | 90 g |
| 1.7 | 150 g | | 150 g |
| 1.8 | 120 g | | 180 g |
| 1.9 | 90 g | | 210 g |
| 1.10 | 60 g | | 240 g |
| 1.11 | 30 g | | 270 g |

Examples 1.13 to 1.17

The experiment of example 1.1 is repeated. Instead of siloxane resin 1, siloxane resin 2, which is solid at 25° C., was used. For these experiments, the LPV1 planetary mixer was equipped with the Butterfly stirring tool. The raw materials were heated to 60° C. with stirring at 680 min$^{-1}$ under a reduced pressure at 100 mbar. When the 60° C. were reached, the temperature was held for 5 minutes at 100 mbar. The amounts of the ingredients used are compiled in table 2.

Examples 1.19 to 1.23

The experiments of examples 1.13 to 1.17 were repeated. Instead of the silyl-terminated polyether 1, silyl-terminated polyether 2 was used. The amounts of the ingredients used are compiled in table 2.

Examples 1.24 to 1.26

The experiments of examples 1.19 to 1.23 were repeated. Instead of the siloxane resin 2, the solid siloxane resin 3 was used. The amounts of the ingredients used are compiled in table 2.

TABLE 2

| Example | Siloxane resin 2 | Siloxane resin 3 | Silyl-terminated polyether 1 | Silyl-terminated polyether 2 |
|---|---|---|---|---|
| 1.13 | 150 g | | 150 g | |
| 1.14 | 120 g | | 180 g | |
| 1.15 | 90 g | | 210 g | |

TABLE 2-continued

| Example | Siloxane resin 2 | Siloxane resin 3 | Silyl-terminated polyether 1 | Silyl-terminated polyether 2 |
|---|---|---|---|---|
| 1.16 | 60 g | | 240 g | |
| 1.17 | 30 g | | 270 g | |
| 1.19 | 150 g | | | 150 g |
| 1.20 | 120 g | | | 180 g |
| 1.21 | 90 g | | | 210 g |
| 1.22 | 60 g | | | 240 g |
| 1.23 | 30 g | | | 270 g |
| 1.24 | | 60 g | | 240 g |
| 1.25 | | 90 g | | 210 g |
| 1.26 | | 120 g | | 180 g |

Example 1.29

120 g of siloxane resin 1, which is liquid at 25° C., were mixed with 90 g of siloxane resin 2, which is solid at 25° C., and with 90 g of silyl-terminated polyether 2. For this purpose the raw materials were first heated to 60° C. with stirring at 680 min$^{-1}$ under a reduced pressure of 100 mbar. When 60° C. was reached, the temperature was held for 5 minutes at 100 mbar. This mixture was dispensed into a moisture-tight bottle.

Example 1.30

The experiment of example 1.29 was repeated. Instead of the amounts of the raw materials indicated in example 1.29, the amounts indicated in table 4 were used.

Example 1.31

The experiment of example 1.29 was repeated. Instead of the siloxane resin 1, siloxane resin 5, which is liquid at 25° C., was used. The amounts of the raw materials indicated in table 4 were used.

TABLE 4

| Example | Siloxane resin 1 | Siloxane resin 2 | Siloxane resin 5 | Silyl-terminated polyether 2 |
|---|---|---|---|---|
| 1.29 | 120 g | 90 g | | 90 g |
| 1.30 | 180 g | 60 g | | 60 g |
| 1.31 | | 90 g | 120 g | 90 g |

Example 1.32

100 g of siloxane resin 6 were mixed with 50 g of silyl-terminated polyether 2, and processed as described in example 1.31.

II) Production of Emulsions

Unless stated otherwise, the examples below were produced in a beaker having a volume of 800 ml and in an Ultra-Turrax® T50 rotor-stator homogenizer with a peripheral speed of 16.2 m/s, IKA®-Werke GmbH & CO. KG, Staufen (DE).

Emulsifier 1: POE(10) isotridecyl ether (available under the name "Lutensol TO 10" from BASF SE, Ludwigshafen (DE));

Emulsifier 2: 1:1 mixture by weight of POE(5) isotridecyl ether (available under the name Lutensol® TO 5 from BASF SE, Ludwigshafen (DE)) and POE(200) castor oil (available as Etocasm 200 from Croda International Plc, Cowick Hall, Snaith Goole East Yorkshire (UK));

Emulsifier 3 : 20 wt % strength solution of polyvinyl alcohol with degree of hydrolysis of 88% and a viscosity for the 4 wt % strength aqueous solution of 4 mPas at 25° C. (available as POLYVIOL® LL2860 from Wacker Chemie AG, Munich (DE));

Emulsifier 4: POE(4) stearyl ether (available as Arlypon® SA 4D from BASF SE, Ludwigshafen (DE));

Emulsifier 5: POE(23) lauryl ether (available under the name "Sympatens ALM/230 G" from Kolb AG);

Emulsifier 6: 1:1 mixture by weight of sorbitan monolaurate (available as Span® 20 from Croda International Plc, Cowick Hall, Snaith Goole East Yorkshire (UK)) and POE (20) sorbitan monolaurate (available as Tween® 20 from Croda International Plc, Cowick Hall, Snaith Goole East Yorkshire (UK));

Emulsifier 7: POE(16) isotridecyl ether (available under the name Arlypon IT 16 from BASF SE, Ludwigshafen (DE));

Preservative 1: Mixture of 3 parts by weight of 5-chloro-2-methyl-2H-isothiazol-3-one and 1 part by weight of 2-methyl-2H-isothiazol-3-one as a 1.5 wt % strength solution in water, available under the designation "Acticide MV" from Thor GmbH, Speyer (DE));

Preservative 2: 2-methyl-2H-isothiazol-3-one as a 10 wt % strength solution in water, available under the designation "Microcare MT" from Thor GmbH, Speyer (DE)).

The emulsions produced in the subsequent examples were tested as follows:

The particle size was determined using a Mastersizer 2000 particle size analyzer from Malvern Instruments GmbH, Herrenberg (DE), software version 5.60, using Mie theory, in accordance with ISO 13320. Parameters used here were as follows:

$R_I$ of the disperse phase=1.39

$R_I$ of the aqueous phase=1.33

Absorption factor=0.01

The values reported for the particle size are always based on the median values of the volume distribution D4,3.

The yield point was determined with an MCR30X rheometer from Anton Paar GmbH, Graz (AT). The method used was an amplitude sweep at 25° C. with increasing shear rate. The value reported refers to the point at which loss modulus and storage modulus have the same value, and is expressed in Pa.

The pH was measured using indicator sticks (non bleeding) for the pH ranges 2.0-9.0, 5.0-10.0, or 0-14 (all available from Merck KGaA, Darmstadt (DE)).

Example 2.1

15 g of water and 15 g of emulsifier 1 were introduced as an initial charge and mixed with 250 g of the mixture from example 1.4 in 3 minutes with homogenization at 4000 rpm. Addition of a further 10 g of water produced a gelatinous paste which was homogenized for a further 5 minutes at 4000 rpm. Thereafter the paste was slowly diluted with 209.3 g of water, 0.45 g of preservative 1 and 0.25 g of preservative 2 within 5 minutes at 4000 rpm, to form a thin emulsion.

Example 2.2

Example 2.1 was repeated using emulsifier 2 rather than emulsifier 1.

Example 2.3

Example 2.1 was repeated, the fraction of the emulsifier 1 being raised to 25 g and the fraction of water for dilution being reduced from 209.3 g to 199.3 g.

Example 2.4

Example 2.2 was repeated, the fraction of the emulsifier 2 being raised to 25 g and the fraction of water for dilution being reduced from 209.3 g to 199.3 g.

Example 2.5

Example 2.4 was repeated using emulsifier 3 rather than emulsifier 2.

Example 2.6

Example 2.4 was repeated using emulsifier 4 rather than emulsifier 2.

Example 2.7

Example 2.4 was repeated using emulsifier 5 rather than emulsifier 2.

Example 2.8

Example 2.1 was repeated using emulsifier 6 rather than emulsifier 1.

Example 2.9

Example 2.1 was repeated using emulsifier 7 rather than emulsifier 1.

Example 2.10

Example 2.2 was repeated, the fraction of the mixture from example 1.4 being raised to 325 g, the fraction of emulsifier 2 being raised to 32.5 g, and the fraction of water for dilution being reduced to 106.8 g.

Example 2.11

Example 2.2 was repeated, the fraction of the mixture from example 1.4 being raised to 375 g, the fraction of emulsifier 2 being raised to 37.5 g, and the fraction of water for dilution being reduced to 51.8 g.

Examples 2.12 to 2.15 and 2.19 to 2.39 Example 2.4 was repeated, replacing the mixture from example 1.4 in each case with 250 g of the mixtures specified in table 5.

The properties of the emulsions are summarized in table 5.

TABLE 5

| Example | Mixture from example | Yield point of gelatinous phase | Particle size [μm] | pH after production |
|---|---|---|---|---|
| 2.12 | 1.1 | 689 Pa | 460 | 5 |
| 2.13 | 1.29 | — | 1260 | 4.5 |
| 2.14 | 1.30 | 560 Pa | 870 | 4.5 |
| 2.15 | 1.31 | — | 740 | 4.5 |
| 2.19 | 1.2 | — | 590 | 4.5 |
| 2.20 | 1.3 | — | 830 | 4.5 |
| 2.21 | 1.5 | — | 970 | 4.5 |
| 2.22 | 1.7 | — | 390 | 4.5 |
| 2.23 | 1.8 | — | 350 | 4.5 |
| 2.24 | 1.9 | — | 410 | 4.5 |
| 2.25 | 1.10 | — | 390 | 4.5 |
| 2.26 | 1.11 | — | 370 | 4.5 |
| 2.27 | 1.13 | — | 2100 | 4.5 |
| 2.28 | 1.14 | — | 8380 | 4.5 |
| 2.29 | 1.15 | — | 990 | 4.5 |
| 2.30 | 1.16 | — | 1450 | 4.5 |
| 2.31 | 1.17 | — | 1480 | 4.5 |
| 2.32 | 1.19 | — | 1510 | 4.5 |
| 2.33 | 1.20 | — | 1590 | 4.5 |
| 2.34 | 1.21 | — | 710 | 4.5 |
| 2.35 | 1.22 | — | 800 | 4.5 |
| 2.36 | 1.23 | — | 780 | 4.5 |
| 2.37 | 1.24 | — | 670 | 4.5 |
| 2.38 | 1.25 | — | 530 | 4.5 |
| 2.39 | 1.26 | — | 880 | 4.5 |

Example 2.40

Example 2.16 was repeated, the fraction of the mixture from example 1.6 being raised to 300 g and the fraction of water for dilution being reduced from 199.3 g to 149.3 g.

Example 2.41

Example 2.4 was repeated, using the mixture produced in example 1.32 rather than the mixture from example 1.4.

10 g of this emulsion were admixed with 0.13 g of 3-aminopropyltrimethoxysilane and 0.27 g of 100 wt % acetic acid. The particle size remained unchanged throughout the observation period. This emulsion therefore displayed good storage stability.

Example 2.42

Example 2.41 was repeated, using emulsifier 7 rather than emulsifier 2.

The properties of the emulsions are summarized in table 6.

TABLE 6

| Example | Yield point of gelatinous phase | Particle size [μm] | pH after production |
|---|---|---|---|
| 2.1 | — | 1805 | — |
| 2.2 | 1930 Pa | 3490 | — |
| 2.3 | — | 2990 | — |
| 2.4 | — | 650 | 4.5 |
| 2.5 | — | 1700 | — |
| 2.6 | — | 320 | 5 |
| 2.7 | — | 3058 | 5 |
| 2.8 | 1450 Pa | — | — |
| 2.9 | — | — | — |
| 2.10 | 644 Pa | 410 | 4.5 |
| 2.11 | 629 Pa | 890 | 4.5 |
| 2.40 | — | 660 | 4.5 |

TABLE 6-continued

| Example | Yield point of gelatinous phase | Particle size [μm] | pH after production |
|---|---|---|---|
| 2.41 | 950 Pa | 338 | 4.5 |
| 2.42 | — | 772 | 4.5 |

Testing of Mechanical Properties

For producing the required test specimens, 20 g of the emulsion from example 2.10 were weighed out, that emulsion having been prepared from the example 1.4 resin. This emulsion was subsequently admixed with 0.02 g of tetramethylguanidine (TMG) and mixed for 30 seconds at 2000 min$^{-1}$ in a Speedmixer DAC 150FVZ from Hauschild Engineering. This mixture was subsequently poured into a PTFE mold having a circular well with a diameter of approximately 20 cm, and stored for 7 days at 23° C. and 50% relative humidity. During this time, the water present evaporated, to give plaques of crosslinked material.

The amount introduced into the PTFE mold was such that the crosslinked plaques after evaporation of the water had a thickness of 0.5 mm+/−0.2 mm.

In order to characterize the crosslinked products thus produced, determinations were made of the characteristic values of tensile strength, elongation at break, and stress at 100% elongation in accordance with DIN 53504. The test specimen used was the S1 dumbbell, with dimensions as specified in DIN 53504, apart from the thickness a. Instead, test specimens having a thickness of 0.5 mm+/−0.2 mm were produced. The actual thicknesses of the test specimens were determined to an accuracy of 0.01 mm prior to measurement using a commercial dial gauge. The characteristic values are determined on a UPM 1446 universal testing machine from Zwick GmbH & Co KG.

The emulsions from the other examples were processed and tested in the same way as for the emulsion from example 2.10. These results are set out in table 7.

TABLE 7

Mechanical values of the emulsions without fillers

| Emulsion from example | Tensile strength [MPa] | Elongation at break [%] | Stress at 100% elongation [MPa] |
|---|---|---|---|
| 2.12 | 2.25 | 385 | 1.6 |
| 2.19 | 1.83 | 270 | 1.3 |
| 2.20 | 1.30 | 310 | 0.8 |
| 2.4 | 1.24 | 418 | 0.7 |
| 2.21 | 1.52 | 476 | 0.7 |
| 2.22 | 2.75 | 369 | 1.6 |
| 2.23 | 1.95 | 306 | 1.2 |
| 2.24 | 1.39 | 252 | 0.9 |
| 2.25 | 1.41 | 303 | 0.8 |
| 2.26 | 1.19 | 278 | 0.7 |
| 2.27 | 4.28 | 20 | / |
| 2.28 | 1.65 | 11 | / |
| 2.29 | 4.16 | 132 | 3.8 |
| 2.30 | 2.42 | 293 | 1.0 |
| 2.31 | 1.45 | 372 | 0.7 |
| 2.32 | 4.99 | 26 | / |
| 2.33 | 1.83 | 206 | 1.2 |
| 2.34 | 4.08 | 123 | 3.5 |
| 2.35 | 1.86 | 221 | 1.0 |
| 2.36 | 6.92 | 59 | / |
| 2.37 | 4.42 | 66 | / |
| 2.38 | 2.89 | 132 | 2.1 |
| 2.39 | 1.40 | 206 | 0.8 |

III) Emulsions with Fillers

Calcium carbonate 1: ground calcium carbonate having an average particle size D50 of 3.4 μm, available under the designation CARBITAL® C110 from Imerys Minerals Ltd., Par, Cornwall, UK;

Calcium carbonate 2: ground calcium carbonate having an average particle size D50 of 5.9 μm, available under the designation OMYACARB® 5-GU from Omya GmbH, Cologne (DE);

Calcium carbonate 3: ground calcium carbonate having an average particle size D50 of 10.7 μm, available under the designation Calcit® FN20 from sh minerals GmbH, Heidenheim (DE);

Calcium carbonate 4: ground calcium carbonate having an average particle size D50 of 20.6 μm, available under the designation Saxolith® 40HE from sh minerals GmbH, Heidenheim (DE).

Example 3.1

2.0 g of calcium carbonate 1 were admixed with 18 g of an emulsion as per example 2.4 and mixed in a Speedmixer DAC 150FVZ for 30 seconds at 2000 min$^{-1}$. Then 0.02 g of tetramethylguanidine (TMG) was added, followed by mixing in the Speedmixer DAC 150FVZ for 30 seconds at 2000 min$^{-1}$.

Example 3.2

The experiment of example 3.1 was repeated. In this case, 2.0 g of calcium carbonate 1 were used with 2 g of calcium carbonate 2 and 16 g of an emulsion as per example 2.4.

Example 3.3

The experiment of example 3.2 was repeated. Instead of the emulsion as per example 2.4, an emulsion as per example 2.31 was used.

Example 3.4

2.0 g of calcium carbonate 1 were mixed with 0.6 g of fully demineralized water in a Speedmixer DAC 150FVZ for 30 seconds at 3540 min$^{-1}$. Then 2.0 g of calcium carbonate 2 and 16 g of an emulsion as per example 2.4 were added, followed by mixing in the Speedmixer DAC 150FVZ for 30 seconds at 2000 min$^{-1}$. Thereafter 0.05 g of tetramethylguanidine (TMG) was added, with mixing in the Speemixer DAC 150FVZ for a further 30 seconds at 2000 min$^{-1}$.

Example 3.5

2.0 g of calcium carbonate 1 and 6.0 g of calcium carbonate 2 were admixed with 2.0 g of fully demineralized water and mixed in a Speedmixer DAC 150FVZ for 30 seconds at 3540 min$^{-1}$. Then 12 g of an emulsion as per example 2.4 were added, with mixing in the Speedmixer DAC 150FVZ for a further 30 seconds at 2000 min$^{-1}$. Lastly 0.02 g of tetramethylguanidine (TMG) was added, with mixing again in the Speedmixer DAC 150FVZ for 30 seconds at 2000 min$^{-1}$.

Examples 3.6 to 3.8

The experiment of example 3.5 was repeated. The ingredients and quantities indicated in table 8 were used.

Example 3.9

The experiment of example 3.5 was repeated. Additionally 0.4 g of 2,2,4-trimethyl-1,3-pentanediol monoisobutyrate was mixed in.

Example 3.10

The experiment of example 3.9 was repeated. In place of the 0.4 g of 2,2,4-trimethyl-1,3-pentanediol monoisobutyrate, 2 g of 2,2,4-trimethyl-1,3-pentanediol monoisobutyrate were used.

Example 3.11

5.0 g of calcium carbonate 1 and 5.0 g of calcium carbonate 2 were mixed with 4.5 g of fully demineralized water in a Speedmixer DAC 150FVZ for 30 seconds at 3540 min$^{-1}$. Then 7.5 g of an emulsion as per example 2.11 and 3.0 g of 2,2,4-trimethyl-1,3-pentanediol monoisobutyrate were added and the whole was mixed in the Speedmixer DAC 150FVZ for 30 seconds at 2000 min$^{-1}$. Thereafter 0.02 g of tetramethylguanidine (TMG) was added and the mixture was mixed in the Speedmixer DAC 150FVZ for a further 30 seconds at 2000 min$^{-1}$.

Example 3.12

The experiment of example 3.11 was repeated. The amount of 2,2,4-trimethyl-1,3-pentanediol monoisobutyrate was raised to 4 g.

Example 3.13

2.0 g of calcium carbonate 1 and 6.0 g of calcium carbonate 2 were mixed with 12 g of an emulsion as per example 2.4 in a Speedmixer DAC 150FVZ for 30 seconds at 2000 min$^{-1}$. Then 0.02 g of a solution of 10 wt % of 1,5,7-triazabicyclo[4.4.0]dec-5-ene (TBD) and 90 wt % of fully demineralized water (TBD 10%) was added and the mixture was mixed in the Speedmixer DAC 150FVZ for 30 seconds at 2000 min$^{-1}$.

TABLE 8

Dispersions with fillers

| Ex. | Calcium carbonate 1 | Calcium carbonate 2 | Emulsion from example 2.4 | TMG [g] | H$_2$O [g] |
|---|---|---|---|---|---|
| 3.6 | 4.0 g | 4.0 g | 12.0 g | 0.02 | 2.0 |
| 3.7 | 6.0 g | 2.0 g | 12.0 g | 0.02 | 2.0 |
| 3.8 | 5.0 g | 5.0 g | 10.0 g | 0.02 | 2.6 |

Subsequently, these emulsions of examples 3.1 to 3.14 were poured, immediately after production, onto silicone-coated release paper, available under the designation "Form RP-1K Release Paper" from Paul N. Gardner Co., Inc., Pompano Beach (FL), USA, and drawn out using a commercial doctor blade to form a film having a thickness of 600 μm. This film was stored for 7 days at 23° C. and 50% relative humidity. During this time, the water present evaporated, to give films of crosslinked material with thicknesses 0.3 mm+/−0.2 mm. Thereafter, together with the release paper, test specimens of form S1 were punched out in analogy to DIN 53504. The film formed from the product was then removed from the release paper, the thickness of the film was determined to an accuracy of 0.01 mm using a dial gauge, and the mechanical characteristic values were measured in accordance with DIN 53504 using a UPM 1446 universal testing machine from Zwick GmbH & Co KG. The measurement values obtained are summarized in table 9.

TABLE 9

Mechanical characteristics of dispersions with fillers

| Example | Tensile strength [MPa] | Elongation at break [%] | Stress at 100% elongation [MPa] |
|---|---|---|---|
| 3.1 | 1.76 | 675 | 0.67 |
| 3.2 | 1.67 | 669 | 0.76 |
| 3.3 | 1.11 | 406 | 0.62 |
| 3.4 | 1.81 | 766 | 0.76 |
| 3.5 | 1.19 | 428 | 1.09 |
| 3.6 | 1.20 | 160 | 1.15 |
| 3.7 | 1.07 | 87 | 1.22 |
| 3.8 | 0.84 | 25 | — |
| 3.9 | 1.17 | 387 | 1.08 |
| 3.10 | 1.27 | 717 | 0.63 |
| 3.11 | 0.93 | 370 | 0.71 |
| 3.12 | 0.99 | 522 | 0.47 |
| 3.13 | 0.69 | 1145 | 0.31 |

Example 4.1

9.0 g of calcium carbonate 1 and 10.5 g of calcium carbonate 2 were mixed with 10.5 g of an emulsion as per example 2.13 in a Speedmixer DAC 150FVZ for 30 seconds at 3540 min$^{-1}$. Then 0.3 g of a solution of 10 wt % of 1,5,7-triazabicyclo[4.4.0]dec-5-ene (TBD) and 90 wt % of fully demineralized water (TBD 10%) was added and the mixture was mixed in the Speedmixer DAC 150FVZ for 30 seconds at 3540 min$^{-1}$.

Example 4.2

The experiment of example 4.1 was repeated. The emulsion as per example 2.13 was replaced by the emulsion as per example 2.14.

Example 4.3

The experiment of example 4.1 was repeated. The emulsion as per example 2.13 was replaced by the emulsion as per example 2.15.

Example 4.4

The experiment of example 4.1 was repeated. The emulsion as per example 2.13 was replaced by the emulsion as per example 2.16.

Example 4.5

The experiment of example 4.3 was repeated. Calcium carbonate 2 was replaced in this case by calcium carbonate 3.

Example 4.6

The experiment of example 4.3 was repeated. Calcium carbonate 2 was replaced in this case by calcium carbonate 4.

Examples 4.7 to 4.9

The experiment of example 4.5 was repeated. In this case the amounts of the emulsion and calcium carbonates 2 and 3 were varied. These formulas are compiled in table 10.

Example 4.10

18.0 g of calcium carbonate 1 were mixed with 12.0 g of an emulsion as per example 2.27 in a Speedmixer DAC 150FVZ for 30 seconds at 3540 min$^{-1}$. Then 0.03 g of a solution of 50 wt % of 1,5,7-triazabicyclo[4.4.0]dec-5-ene (TBD) and 50 wt % of ethanol was added and the mixture was mixed in the Speedmixer DAC 150FVZ for 30 seconds at 3540 min$^{-1}$.

Example 4.11

The experiment of example 4.10 was repeated. Calcium carbonate 1 was replaced in this case by calcium carbonate 4.

Example 4.12

The experiment of example 4.10 was repeated. Calcium carbonate 1 was replaced in this case by calcium carbonate 2.

Example 4.13

9.0 g of calcium carbonate 1 and 9.0 g of calcium carbonate 4 were mixed with 12.0 g of an emulsion as per example 2.27 in a Speedmixer DAC 150FVZ for 30 seconds at 3540 min$^{-1}$. Then 0.03 g of a solution of 50 wt % of 1,5,7-triazabicyclo[4.4.0]dec-5-ene (TBD) and 50 wt % of ethanol was added and the mixture was mixed in the Speedmixer DAC 150FVZ for 30 seconds at 3540 min$^{-1}$.

Example 4.14

9.0 g of calcium carbonate 1 were mixed with 3.0 g of fully demineralized water in a Speedmixer DAC 150FVZ for 30 seconds at 3540 min$^{-1}$. Then 9.0 g of calcium carbonate 4 and 12.0 g of an emulsion as per example 2.27 were mixed in the Speedmixer DAC 150FVZ for 30 seconds at 3540 min$^{-1}$. Thereafter 0.03 g of a solution of 50 wt % of 1,5,7-triazabicyclo[4.4.0]dec-5-ene (TBD) and 50 wt % of ethanol was added and the mixture was mixed in the Speedmixer DAC 150FVZ for 30 seconds at 3540 min$^{-1}$.

Example 4.15

9.0 g of calcium carbonate 1 and 10.5 g of calcium carbonate 2 were mixed with 10.5 g of an emulsion as per example 2.15 in a Speedmixer DAC 150FVZ for 30 seconds at 3540 min$^{-1}$. Then 0.03 g of a solution of 10 wt % of 1,5,7-triazabicyclo[4.4.0]dec-5-ene (TBD) and 90 wt % of fully demineralized water (TBD 10%) was added and the mixture was mixed in the Speedmixer DAC 150FVZ for 30 seconds at 3540 min$^{-1}$.

Example 4.17

The experiment of example 4.15 was repeated. In this case the amount of the solution of 10 wt % of 1,5,7-triazabicyclo[4.4.0]dec-5-ene (TBD) and 90 wt % of fully demineralized water (TBD 10%) was increased to 0.09 g.

Example 4.18

9.0 g of calcium carbonate 1 and 9.0 g of calcium carbonate 2 were mixed with 12.0 g of an emulsion as per example 2.15 in a Speedmixer DAC 150FVZ for 30 seconds at 3540 min$^{-1}$. Then 0.03 g of a solution of 10 wt % of 1,5,7-triazabicyclo[4.4.0]dec-5-ene (TBD) and 90 wt % of fully demineralized water (TBD 10%) was added and the mixture was mixed in the Speedmixer DAC 150FVZ for 30 seconds at 3540 min$^{-1}$.

Example 4.19

7.5 g of calcium carbonate 1 and 7.5 g of calcium carbonate 2 were mixed with 15.0 g of an emulsion as per example 2.16 in a Speedmixer DAC 150FVZ for 30 seconds at 3540 min$^{-1}$. Then 0.03 g of a solution of 50 wt % of 1,5,7-triazabicyclo[4.4.0]dec-5-ene (TBD) and 50 wt % of denatured ethanol (TBD/ethanol 50%) was added and the mixture was mixed in the Speedmixer DAC 150FVZ for 30 seconds at 3540 min$^{-1}$.

Example 4.20

The experiment of example 4.19 was repeated. The emulsion as per example 2.16 was in this case replaced by the emulsion as per example 2.40.

TABLE 10

Composition of the dispersions with added filler and added catalyst

| Ex. | Calcium carbonate 1 | Calcium carbonate 3 | Emulsion from example 2.15 | TBD 10% [g] |
|---|---|---|---|---|
| 4.7 | 9.0 g | 12.0 g | 9.0 g | 0.3 |
| 4.8 | 6.0 g | 13.5 g | 10.5 g | 0.3 |
| 4.9 | 10.5 g | 9.0 g | 10.5 g | 0.3 |

The mixtures from examples 4.1 to 4.20 were subsequently spread immediately into a PTFE mold with a cuboidal depression and dimensions of depth×width×length=4×10×80 mm. These molds with the test specimens were stored for 14 days at 23° C. and 50% relative humidity. During this time, the water present evaporated, to give moldings of crosslinked material. Thereafter the cured samples were removed from the PTFE mold and the hardness was measured in Shore A in accordance with DIN ISO 7619-1. In deviation from the standard, the above-described test specimens with dimensions of thickness×length×width=4×10×80 mm were used in this case. The measurement was performed on the top face of the test specimens. The top face is the side not in contact with the PTFE of the mold used. In certain selected cases, moreover, measurements were made of the flexural strength, the flexural modulus, and the sagging in accordance with ISO 178:2011-04 Method A, with a testing speed of 2 ram/min and a support distance of 60 mm. The measurements were conducted on 5 test specimens in each case. In the test, the specimens were always inserted into the machine in the way in which they were also present in the PTFE mold, i.e., with the top face upward. The reported values for the flexural strength in MPa, the flexural modulus in GPa, and the sagging in mm correspond to the respective average of the individual measurements, in each case rounded to one decimal place in accordance with DIN 1333:1992-02 section 4.5. The sagging was measured on the top face of the test specimens.

The measurement values obtained are compiled in table 11.

TABLE 11

| Example | Sagging [mm] | Flexural strength [MPa] | Elasticity modulus [GPa] | ShA hardness |
|---|---|---|---|---|
| 4.1 | | | | 92 |
| 4.2 | 0.6 | 7.4 | 2.3 | 94 |
| 4.3 | | | | 95 |
| 4.4 | | | | 88 |
| 4.5 | | | | 94 |
| 4.6 | | | | 95 |
| 4.7 | | | | 90 |
| 4.8 | | | | 96 |
| 4.9 | | | | 95 |
| 4.10 | 2.0 | 4.9 | 0.5 | |
| 4.11 | 1.7 | 7.7 | 0.3 | |
| 4.12 | 4.1 | 4.1 | | |
| 4.13 | 1.8 | 5.3 | 0.2 | 91 |
| 4.14 | 2.2 | 5.9 | 0.4 | 96 |
| 4.15 | 0.1 | 1.8 | | 71 |
| 4.17 | 1.6 | 2.3 | 0.2 | 84 |
| 4.18 | 1.8 | 2.0 | 0.1 | 76 |
| 4.19 | 4.2 | 8.4 | 0.7 | 98 |
| 4.20 | | | | 93 |

The invention claimed is:

1. A aqueous dispersion, comprising:
(A) at least one silyl-terminated polymer of the formula

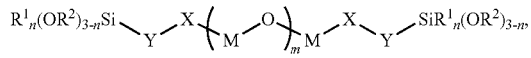

(I)

where
R¹ are identical or different and are monovalent, optionally substituted, SiC-bonded hydrocarbyl radicals,
R² are identical or different and are hydrogen or monovalent, optionally substituted hydrocarbyl radicals,
X are identical or different and are —O—, —NR³ where R³ is hydrogen, or an aliphatically saturated or aromatic hydrocarbyl radical having 1 to 12 carbon atoms,
Y are identical or different and are radicals —(CH$_2$)$_3$—, —(CH$_2$)$_3$NHC(=O)—, —CH$_2$—, or —CH$_2$NHC(=O)—,
M are identical or different and are radicals —CH$_2$CH$_2$—, —CH$_2$CH(CH$_3$)—, —(CH$_2$)$_4$—, or —(CH$_2$)$_6$—,
n is 0 or 1, and
m is an integer from 50 to 500,
(B) organosilicon compounds comprising units of the formula

(II), where
R⁴ are identical or different and are monovalent, optionally substituted SiC-bonded hydrocarbyl radicals,
R⁵ are identical or different and are hydrogen or a monovalent, optionally substituted hydrocarbyl radical,
a is 0, 1, 2 or 3,
b is 0, 1, 2 or 3,
with the provisos that the sum a+b≤3, there are at least two groups —OR⁵ per molecule, and a is 0 or 1 in at least 40% of all units of the formula (II),
(C) emulsifiers,
(D) water,
(E) optionally catalysts,
(F) optionally fillers, and
(G) optionally further additives,
wherein when any of R¹, R², R⁴ or R⁵ are substituted, the substituents are halogen, amine, or epoxy substituents, and
wherein components (A) and (B) crosslink upon partial or complete removal of water.

2. The aqueous dispersion of claim 1, wherein at least 90% of all radicals M in component (A) have the definition of —CH$_2$CH(CH$_3$)—.

3. The aqueous dispersion of claim 1, wherein in silicon compounds (B), a is 1 in at least 50% of all units of the formula (II).

4. The aqueous dispersion of claim 2, wherein in silicon compounds (B), a is 1 in at least 50% of all units of the formula (II).

5. The aqueous dispersion of claim 1, wherein catalyst (E) comprises carboxylic acids, dicarboxylic acids, organophosphoric acid and monoesters and diesters thereof, phosphonic acids and the monoesters thereof, diorganophosphinic acids, organic nitrogen compounds, or salts of the acids with the organic nitrogen compounds, and mixtures thereof.

6. The aqueous dispersion of claim 1, wherein the dispersion comprises,
based in each case on 100 parts by weight of the total weight of components (A) and (B),
2 to 10 parts by weight of component (C),
20 to 100 parts by weight of component (D),
10 to 50 parts by weight of component (F),
optionally 0.001 to 2 parts by weight of component (E), and
optionally 0.0005 to 2 parts by weight of at least one component (G) which are preservatives and/or light stabilizers,
with the proviso that the weight ratio of component (B) to component (A) is in the range from 0.1:1 to 1:1.

7. The aqueous dispersion of claim 1, wherein the dispersion comprises,
based in each case on 100 parts by weight of the total weight of components (A) and (B),
2 to 10 parts by weight of component (C),
20 to 100 parts by weight of component (D),
600 to 1400 parts by weight of component (F),
optionally 0.001 to 2 parts by weight of component (E), and
optionally 0.0005 to 2 parts by weight of at least one component (G) which is a preservative,
with the proviso that the weight ratio of component (B) to component (A) is 1:1 to 10:1.

8. A method for producing a aqueous dispersion of claim 1, comprising mixing components (A), (B), and (C) and further components and subsequently emulsifying the resulting mixture by adding water (D) and also component (C) and optionally further components.

9. The method of claim 8, in which
in a 1st step
components (A) and (B) are mixed by stirring and/or homogenizing,
in a 2nd step components (C) and (D) are added to the mixture obtained in the 1st step, and an emulsion is produced by rapid stirring, optionally in a 3rd step further water (D) is added, and optionally in a 4th step further substances are mixed in, optionally as a premix with further water (D).

10. A shaped article produced by crosslinking an aqueous dispersion of claim 1.

11. A shaped article produced by crosslinking an aqueous dispersion prepared by the method of claim 8.

12. A shaped article produced by crosslinking an aqueous dispersion prepared by the method of claim 9.

13. The shaped particle of claim 10, which is a coating or sealant.

14. The aqueous dispersion of claim 1, wherein the organosilicon compounds (B) have a weight average molecular weight of from 500 g/mol to 9000 g/mol.

15. The aqueous dispersion of claim 1, wherein the organosilicon compounds (B) have a polydispersity of 1 to 4.

16. The aqueous dispersion of claim 1, wherein at least one of $R_1$, $R^2$, or $R^4$ is a 3-aminopropyl or a 3-(2-aminoethyl)aminopropyl radical.

17. The aqueous dispersion of claim 1, wherein at least one of $R_1$, $R^2$, or $R^4$ is 3-glycidoxypropyl.

18. The aqueous dispersion of claim 1, wherein at least one of $R_1$, $R^2$, or $R^4$ is substituted by fluorine.

* * * * *